(No Model.) 4 Sheets—Sheet 1.

M. E. COOK.
EARTH LOADER AND CONVEYER.

No. 316,243. Patented Apr. 21, 1885.

Witnesses: Marcus E. Cook, Inventor
By atty.

(No Model.) 4 Sheets—Sheet 2.

M. E. COOK.
EARTH LOADER AND CONVEYER.

No. 316,243. Patented Apr. 21, 1885.

(No Model.) 4 Sheets—Sheet 3.

M. E. COOK.
EARTH LOADER AND CONVEYER.

No. 316,243. Patented Apr. 21, 1885.

Witnesses,

Marcus E. Cook, Inventor
By Atty.

(No Model.)  4 Sheets—Sheet 4.

M. E. COOK.
EARTH LOADER AND CONVEYER.

No. 316,243.  Patented Apr. 21, 1885.

Witnesses  
Marcus E. Cook  
Inventor  
By Atty

UNITED STATES PATENT OFFICE.

MARCUS E. COOK, OF WALLINGFORD, CONNECTICUT.

EARTH LOADER AND CONVEYER.

SPECIFICATION forming part of Letters Patent No. 316,243, dated April 21, 1885.

Application filed October 20, 1884. (No model.)

*To all whom it may concern:*

Be it known that I, MARCUS E. COOK, of Wallingford, in the county of New Haven and State of Connecticut, have invented a new Improvement in Earth Loader and Conveyer; and I do hereby declare the following, when taken in connection with accompanying four sheets of drawings, and the letters of reference marked thereon, to be a full, clear, and exact description of the same, and which said drawings constitute part of this specification, and represent, in—

Figure 1:
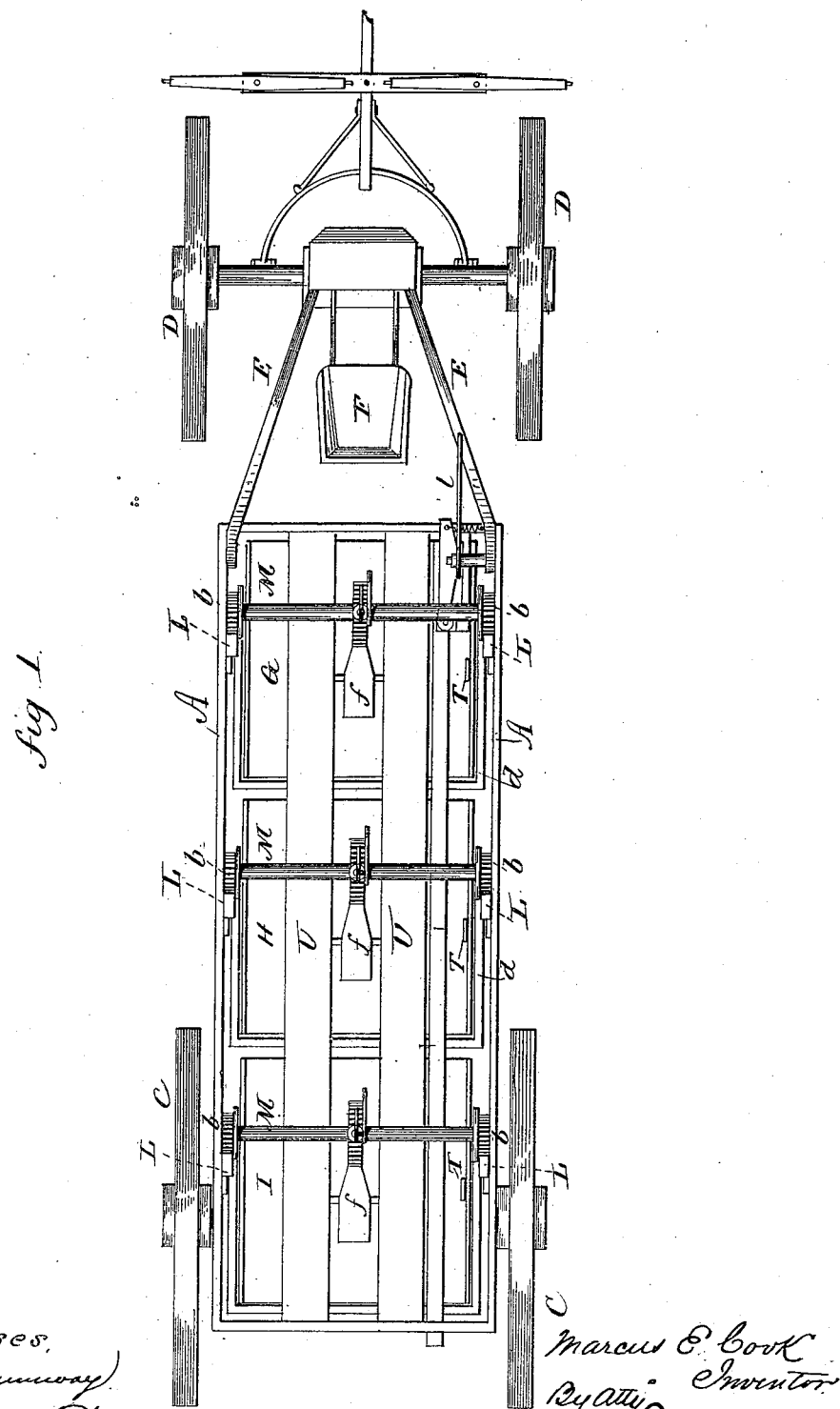
Figure 2:
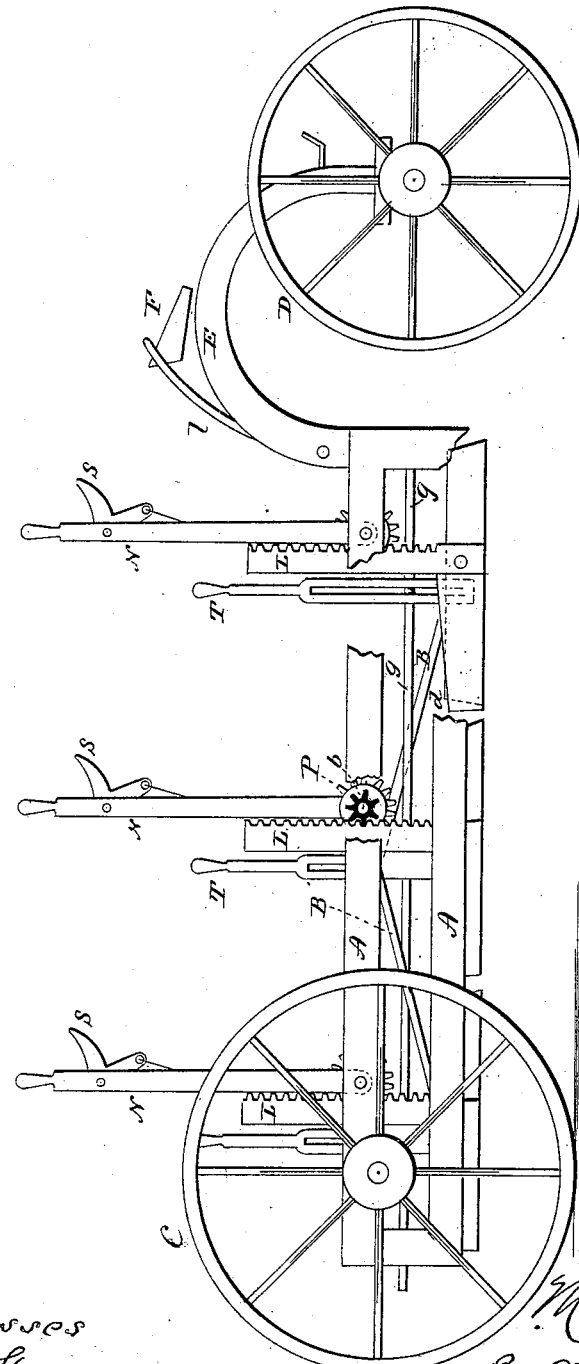
Figure 3:
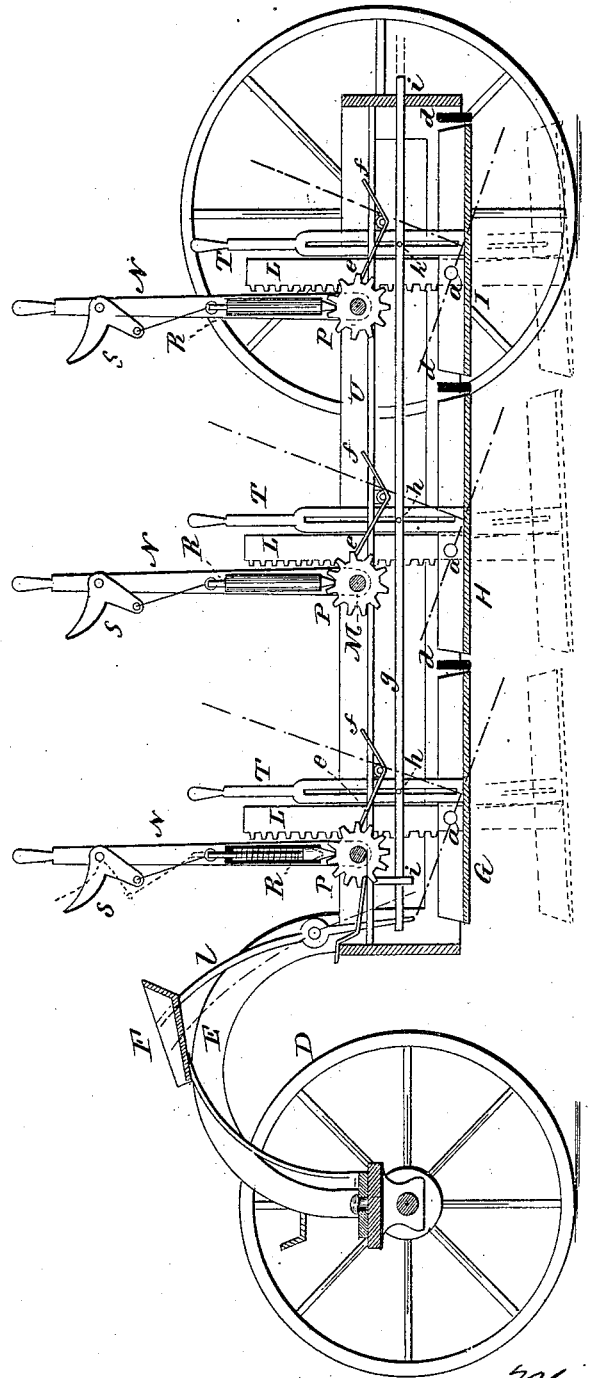
Figure 4:
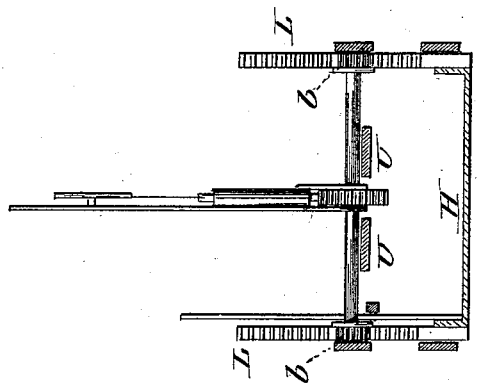

Figure 1, a top view; Fig. 2, a side view, parts broken away to expose other portions of the apparatus; Fig. 3, a longitudinal vertical section; Fig. 4, a transverse section.

This invention relates to an apparatus arranged upon wheels to be drawn by horses or otherwise, and by which earth may be gathered in a mass by the advance movement of the apparatus, and then that mass transferred by the apparatus to any desirable point, the apparatus being designed with special reference to road making or grading; and the invention consists in the construction hereinafter described, and particularly recited in the claims.

In illustrating the apparatus I show it as arranged with three platforms.

The frame or body is made from timber of suitable dimensions, the sides consisting of a pair of parallel beams, A A, united at their ends, and provided with a brace-support, B, by which strength is given to the frame-work. This frame or body is arranged upon wheels, one pair, C C, near the rear, the other pair, D D, forward, with a yoke, E, extending from the body upward and downward onto the forward axle, so as to permit the forward wheels to "cut under," and at the forward end the apparatus is provided with a seat, F, for the driver, and the forward axle is provided with a pole, or other device, by which the animals may be attached to draw the apparatus.

G, H, and I are the three platforms, made from iron or steel. In the frame-work of the body vertical slides L L are arranged, every one at each side directly opposite one on the other side, one pair of such slides for each platform, and to these slides the platform is pivoted, as at *a*, (see Fig. 3,) and so that it may be turned forward or backward or held in a horizontal position. One edge of each of the slides L is fitted with gear-teeth to form a rack.

Transversely across the body are parallel shafts M, near the respective slides L, and each shaft carries pinions *b*, working into the teeth of the slides L. These shafts take their bearing in the sides of the frame. Upon each shaft a lever, N, is hung loose upon the shaft, so that it may be turned backward or forward free of the shaft, if desirable. Adjacent to each lever, and on the respective shafts, is a toothed ratchet, P, and upon the corresponding side of each lever is a spring-dog, R, arranged to be moved vertically, but provided with a spring, as seen in Fig. 3, the tendency of which is to force the nose of the dog into the teeth of the ratchet. On each lever is a bell-crank lever, S, one arm of which is connected to the dog and the other affording means whereby the operator may raise the dog, as indicated in broken lines, Fig. 3, by turning the bell-crank lever. When the dog is engaged with the ratchet, as seen in Fig. 3, then the turning of the lever N in either direction will correspondingly turn the shafts M and move the slides L accordingly—that is to say, if, under the arrangement shown in Fig. 3, the lever be turned backward, then the slides may be moved down, taking with them the platform G, as indicated in broken lines. Turned in the opposite direction, the platforms will be accordingly raised.

To each of the platforms a hand-lever, T, is applied, by which the platforms may be tilted, as indicated in broken lines—that is, the operator taking hold of the lever may tip the platform forward or backward, as the case may be.

Attached to each slide and extending around the rear of each platform, is a guard, *d*, which rises and falls with the platform, but being detached from the platform does not partake of its tilting movement. This guard serves as a border around the platform to prevent the escape of the earth which may be gathered thereon.

Near each of the ratchets is a dog, *e*, which holds the ratchets, so as to prevent their turning in either direction. These dogs are provided with a foot-piece, $f$, upon which the operator may place his foot to turn the dog from engagement with the ratchet. The levers T are arranged at one side of the apparatus, and are connected by a rod, $g$. The levers T are each constructed with a vertical slot, and from the rod $g$ a stud, $h$, extends into the slots. The rod $g$ is supported in guides $i$, so as to permit its longitudinal movement. At its forward end it is in connection with a lever, $l$, which extends up to a convenient position near the seat of the driver, and by which he may impart longitudinal movement to the rod $g$, as, for illustration, suppose the driver turns the lever $l$ to the position indicated in broken lines, Fig. 3, it will move the bar $g$ accordingly, and because of its connection with the levers T will turn those levers, and also the platforms, as indicated in broken lines, and in so turning the platforms it will be observed that the rear edge drops below the guards $d$, so as to open a space between the guard and the platform, and so that the earth on the platform will be dumped or slide off to the rear, or turned in the opposite direction, the platforms will be turned to a forward incline, as indicated in broken lines, Fig. 3, in the down position, and so that the forward edge will strike the earth as a scraper.

In operation, supposing the platforms to be raised, and the apparatus approaching the point where it is desired to gather and remove the earth, the workman, placing his foot upon the pedal-extension $f$ of the dog $e$, relieves the ratchet from the control of the dog, and then turning the lever N, so as to move the platform downward, say, as indicated in broken lines, the driver giving the proper inclination to the platform, the forward advance of the platform will gather upon it the earth until it be properly loaded. Then, bringing the platform to its level or horizontal plane, the workman returns the lever N to raise the platform. When the several platforms have thus been loaded, the apparatus is drawn to the place of dumping, then the platforms tilted, as described, and shown in broken lines, to dump the earth at the rear. The guard $d$, which surrounds the platform at the rear, prevents the escape of earth in the movement of the apparatus.

I have represented three platforms; but it will be understood that more or less may be employed, say a single platform corresponding to the one at the rear, and that arranged upon a single pair of wheels.

In operation the platforms may be adjusted with relation to each other, so that the forward will take a certain depth, then the next, and so on, and so that the several platforms will be simultaneously loaded.

In constructing the sides of the frame of the apparatus as two parallel beams, with supporting-braces between, I produce a very strong body or support for the platforms, such strength being necessary where several platforms are employed.

Longitudinal planks U are arranged on the top of the frame as a floor upon which the workman may stand.

I claim—

1. The combination of a frame supported upon wheels, a platform transversely across said frame and hung in vertical slides movable in said frame, mechanism, substantially such as described, to impart up and down movement to said slides and to the platform, a lever attached to said platform by which it may be tilted backward or forward, and a guard attached to said slides and surrounding the rear end of the platform, substantially as and for the purpose described.

2. The combination of a frame supported upon wheels at the front and rear, two or more platforms transversely across said frame, each hung to vertical slides, transverse shafts supported in said frame, each carrying pinions corresponding, respectively, to teeth on said slides, a hand-lever upon each of said shafts by which rotation may be imparted to said shafts to raise or lower said slides and platform, a lever extending up from each platform and by which they may be tilted, and a bar connecting said tilting-levers, substantially as described, and so that the tilt of one platform is imparted to the others.

3. The combination of a frame supported upon wheels at the front and rear, two or more platforms transversely across said frame, each hung to vertical slides, transverse shafts supported in said frame, each carrying pinions corresponding, respectively, to teeth on said slides, a hand-lever upon each of said shafts by which rotation may be imparted to said shafts to raise or lower said slides and platform, a lever extending up from each platform and by which they may be tilted, a bar connecting said tilting-levers, and a hand-lever adjacent to the driver's seat, in connection with said bar, substantially as described, and whereby the driver may tilt the platforms.

4. The combination of a frame supported upon wheels, vertically-guided slides L, a platform hung to said slides, a hand-lever, T, extending upward from said platform, guard $d$, attached to said slides and surrounding the rear of the platform but independent thereof, transverse shaft M, pinions $b$ thereon working into corresponding teeth on said vertical slides L, a ratchet on said shaft, a hand-lever hung loose upon said shaft, and a dog upon said lever arranged to engage said ratchet, substantially described.

5. The combination of a frame supported upon wheels, two or more pairs of vertically-guided slides, a platform hung to each pair of said slides, a vertically-slotted lever, T, extending up from each of said platforms, transverse shafts M, pinions $b$ on said shafts corresponding to teeth on said vertical slides, a ratchet, P, on each of said shafts, a lever, N, hung to each of said shafts, a dog on each of said levers corresponding to the ratchet on its shaft, longitudinal bar $g$, in connection with each of said levers T, said bar extending forward, and a hand-lever, $l$, hung adjacent to the seat of the driver, said hand-lever $l$ in connection with said bar $g$, substantially as and for the purpose described.

6. The combination of a frame supported upon wheels, two or more pairs of vertically-guided slides, L, a platform hung to each of said pairs of slides, a guard, $d$, attached to each of said pair of slides and surrounding the rear of the respective platforms, a hand-lever, T, extending up from each of said platforms, transverse shafts M, pinions $b$ on said shafts corresponding to the teeth on said slides L, a ratchet, P, on said shafts, a hand-lever hung upon said shafts adjacent to said ratchets, and a dog, R, on said levers to engage said ratchets, substantially as described.

MARCUS E. COOK.

Witnesses:
 HENRY MARTIN,
 WM. R. ANDREWS.